Figure 1:
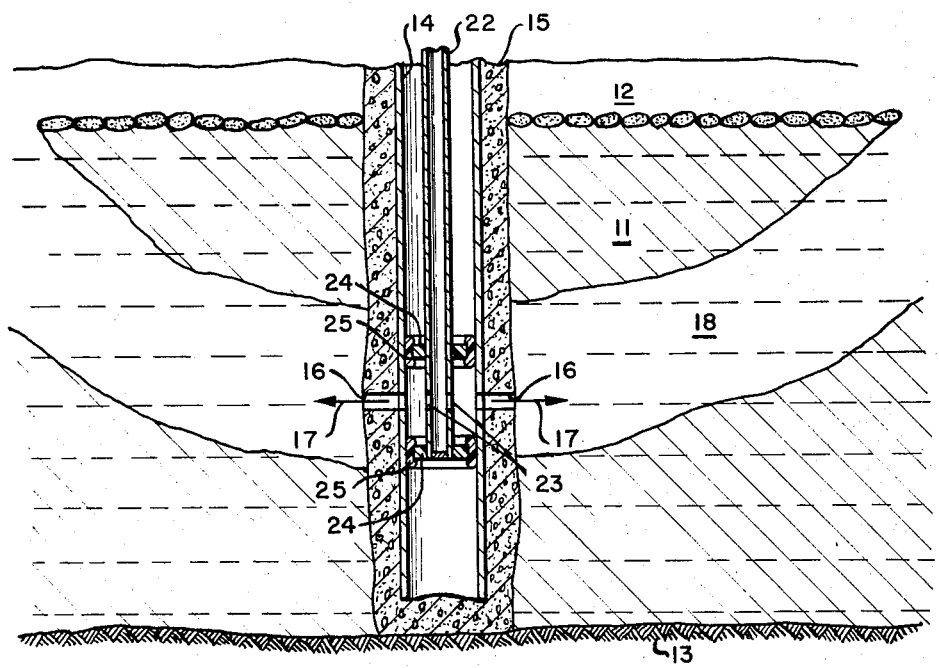

Dec. 19, 1967    P. J. CLOSMANN    3,358,762
THERMOAUGMENTATION OF OIL-PRODUCING RESERVOIRS
Filed Dec. 6, 1965    2 Sheets-Sheet 1

INVENTOR:
PHILIP J. CLOSMANN
BY: Joseph L. Strabala
HIS ATTORNEY

United States Patent Office 3,358,762
Patented Dec. 19, 1967

3,358,762
THERMOAUGMENTATION OF OIL-PRODUCING
RESERVOIRS
Philip J. Closmann, Houston, Tex., assignor to Shell Oil Company, New York, N.Y., a corporation of Delaware
Filed Dec. 6 1965, Ser. No. 511,660
7 Claims. (Cl. 166—40)

This application is a continuation-in-part of my pending application, Ser. No. 430,613, filed Feb. 5, 1965, entitled, "Thermoaugmentation of Oil Production From Subterranean Reservoirs," now Patent No. 3,295,511.

Specifically, this invention relates to the recovery of oil from subterranean, oil-bearing reservoirs and more particularly, to a method of injecting heated fluids into a limited zone of an oil-producing reservoir having a vertical permeability comparable to the horizontal permeability and subsequently recovering reservoir fluids through this limited injection zone to enhance the production of oil from the reservoir.

While the viscosity of various crude oils spans a wide range, many are relatively viscous materials but their viscosity decreases as the temperature of the crude is increased. Thus, if sufficient thermal energy is added to even a relatively viscous crude, such as those typified by some of the viscous crudes in California, the addition of heat will convert these crudes to a more mobile liquid. Because of the reduction in viscosity and increased mobility, it will be easier to recover these crudes from the reservoir. Even the non-viscous crudes, comparatively speaking, can be more easily recovered when heated and often in such cases the total quantitative recovery is greatly enhanced by such treatment.

Further, petroleum crudes are often found in reservoirs having relatively small pores, commonly referred to as "tight" sandstones or limestones and in such formation viscous crudes, and even crudes much less viscous, are quite immobile in the reservoir at normal reservoir conditions and, therefore, difficult to recover. In these cases, the addition of thermal energy to the reservoir can reduce the viscosity of these crudes to a point where they flow quite easily through even the limited port space in such a tight formation. It has been demonstrated that quantitative recovery from oil-producing reservoirs can be materially enhanced by the addition of thermal energy to the reservoir and many processes have evolved using thermoaugmentation in reservoirs. Examples of these processes are in-situ combustion and/or injections of heated fluids into the reservoir, both of which are capable of heating the crudes within the reservoir to a temperature above their natural state to increase oil production from the reservoir.

More specifically, the present invention relates to the use of heated fluids, such as steam, in the recovery of crudes from oil-bearing reservoirs in which the vertical permeability is half the horizontal and is limited to those processes in which the oil is recovered through the same borehole which is used to inject the heated fluids. This type of process is often referred to as "backflow" recovery. This is distinct from the so-called "drives" in which an input well and an output well spaced from the input well are used in a process in which one well is used as an injection well and the second well is used as a recovery well, and injected fluids drive the oil in the reservoir between the spaced wells toward the output well. The difference in such techniques can be appreciated by viewing what is sought to be accomplished. In the drive process, the object is to drive the crude away from the vicinity of the input well and toward the production well; however, in backflow recovery techniques, which are based on stimulation, it is undesirable to drive the oil away from the input well since it will eventually become the recovery well and oil driven away therefrom will have to flow back through the reservoir to the well in order to be recovered. Thus, it should be appreciated that there are substantial differences in these two types of recovery processes.

In the practice of the instant invention, which is an improved backflow, it is possible to avoid displacing substantial volumes of oil located around the borehole and still add sufficient thermal energy to the reservoir in a manner that materially enhances the oil recovery therefrom. Broadly, this can be accomplished in reservoirs having a vertical injectivity equal to at least one-half the horizontal injectivity by a process wherein the heated fluids are injected through a borehole into a limited zone or interval within the central portion of such an oil-bearing reservoir and subsequently recovering oil from the reservoir only through the same zone or interval. Of course, during the recovery cycle the pressures within the borehole must be reduced to pressures below those of the injection pressures and possibly below those existing within the reservoir formations in order to cause fluids to flow into the borehole.

The method of the invention can be applied to oil-bearing, permeable reservoirs which have a vertical injectivity equal to at least one-half the horizontal injectivity. Further, it can be used in reservoirs containing viscous or light (low viscosity) crudes. Also, the method of the invention is applicable to reservoirs which are no longer capable of natural flow, such as those depleted by primary recovery and oil recovery in these reservoirs, often referred to as "secondary recovery" or "tetiary recovery."

More specifically, this invention relates to a technique for recovering oil from reservoirs having both horizontal and vertical gas permeability such that cross-flow within the reservoir can occur. The process can be applied to reservoirs wherein the vertical injectivity is at least one-half of the horizontal injectivity or greater. As a matter of qualification, the terms vertical and horizontal are used herein to refer to the directions perpendicular and parallel, respectively, to the boundary planes of the reservoir interval. Thus, the technique of the invention is applicable to a dipping reservoir having an inclination ranging from about 0 to 60° and the injectivity ratio is determined with reference to the boundary planes of such a reservoir interval. The term injectivity refers to the receptivity of the reservoir formation to the flow of fluids injected at pressures less than the fracturing pressure of the reservoir. For example, if the vertical injectivity is one-half that of the horizontal injectivity, an injected fluid will move in a direction perpendicular to the reservoir boundary at a significant rate. The relative magnitude of the vertical and horizontal injectivities of a reservoir can be determined by known methods using correlations of logs and core information and/or by a direct determination of the rates at which fluids move from one level to another along the path between a pair of wells such as an operational well and a pilot well.

In general, crudes can be recovered from many reservoirs such as those described above using this invention more economically than in known processes. That is, more oil per unit volume of steam injected can be obtained with other thermal recovery processes using heated fluids.

One reason more oil is recovered with the present invention per unit volume of heated fluid added to the reservoir is that the heat from the heated fluid is efficiently transferred to the formation in a manner to achieve the maximum thermal augmentation. Further, it is possible to achieve this maximum benefit without a wholesale displacement of the oil surrounding the borehole through which recovery is to be subsequently effected. Of course, other advantages will be apparent from the specific description as follows and from the practical side, since most producers are interested in the cost per barrel of oil obtained through the use of any process; the lower cost per barrel with my process is one of the principal advantages of the present invention over those of the prior art.

To obtain the advantages and benefits of this novel method involves a process having the steps of: (1) penetrating the oil-bearing reservoir with a borehole; (2) sealing a casing string in the borehole at least to the extent of the borehole's penetration of the reservoir; (3) providing fluid communications between the casing string and the reservoir interval only in the central portion of the reservoir interval; (4) injecting a heated fluid into the reservoir through the centrally located fluid communications; (5) confining the heated fluid in the reservoir for a period sufficient to transfer some of the thermal energy of the fluids to the reservoir; and (6) thereafter establishing backflow into the casing string through the same fluid communications used for injecting the heated fluids.

This invention differs from that described in my copending application Ser. No. 430,613 now Patent No. 3,295,511, mentioned above in that recovery of the crude is accomplished through the same perforations (restricted to the central portion of the reservoir) that were used to inject the heated fluid. In the process of my copending application, the recovery is effected throughout the total interval of the reservoir after limiting the injection to the central portion thereof.

Injecting heated fluids into oil-producing reservoirs is not new and also is not a universal panacea to additional oil recovery. In some instances, the injection of steam or other non-combustible heated gases prior to backflow recovery has resulted in a decrease instead of an increase in the oil produced, especially where steam is injected over the entire reservoir interval. Differences in quantitative recovery per unit of steam injected in prior art processes as compared to the better recovery obtained by the instant invention are partially caused by the displacement of the oil contiguous to the borehole to remote locations in the reservoir, inefficient heat transfer, etc., of the prior art processes.

Many of these difficulties are avoided by the present invention by restricting the flow of heated fluids into a reservoir along generally centralized zones within the middle portion of the reservoir. Preferably, the flow of fluids into the reservoir is restricted into a zone having a thickness from one-fourth or one-third of that of the total reservoir interval. In actual field tests, it was demonstrated that the amount of oil thermally mobilized and recoverable by this technique is about twice that obtained by using prior art procedures where steam is injected over the whole interval with the same quantity of heated fluids being injected. Probably the two major factors increasing recovery are that this technique does not displace much of the oil away from the borehole and secondly, the heat is actually transferred to portions of the reservoir both above and below the zone, thereby minimizing heat loss to adjacent impermeable, non-oil producing strata. In reservoirs wherein the vertical injectivity is at least one-half that of the horizontal injectivity (as described above) it was found that cross-flow within the reservoir occurred sufficiently to allow the recovery of the effluents from the reservoir to be accomplished through the same perforations as those used for injecting heated fluids into the central portion of the reservoir with no loss of quantitative recovery and, in many cases, increased recovery. Also, the effluents obtained from the reservoir tend to contain less water since gravity segregation of the water produced as the steam condenses, if steam is used, causes it to collect in the lower regions of the reservoir where it will be less likely to enter the borehole through the perforations located in the central portion of the reservoir. Further, the expense of additinal perforations is avoided.

While heated fluids have been referred to above, in the practice of the invention, steam is probably the most readily available heated fluid and it can be low quality steam (a mixture of steam and water) or high quality steam. However, other heated fluids, such as inert gases, can likewise be used but in general, steam will be the principal one because of the comparatively large quantity of heat available per unit mass as latent heat.

Figure 2:
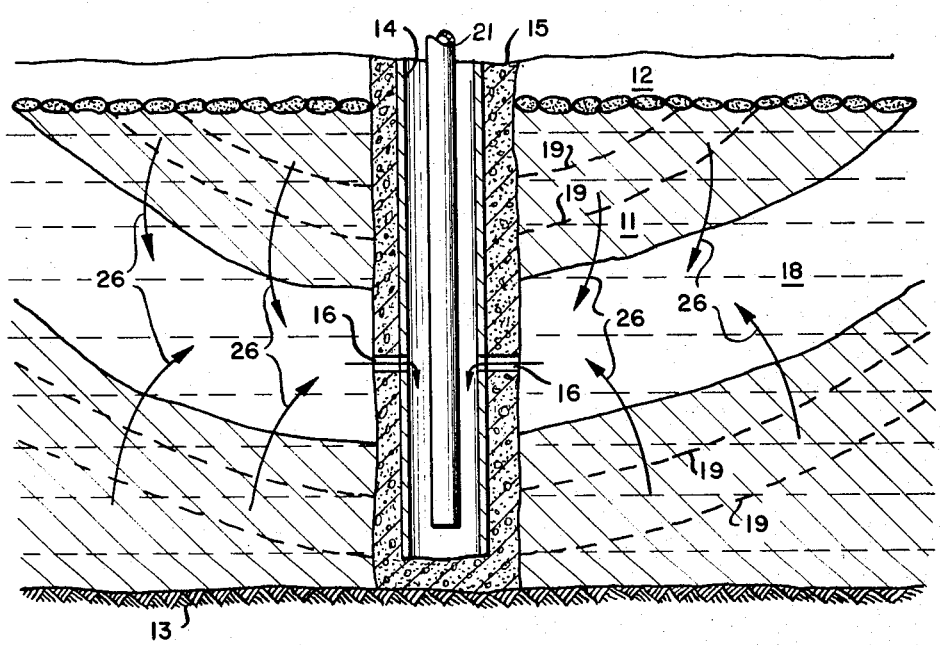
Figure 3:
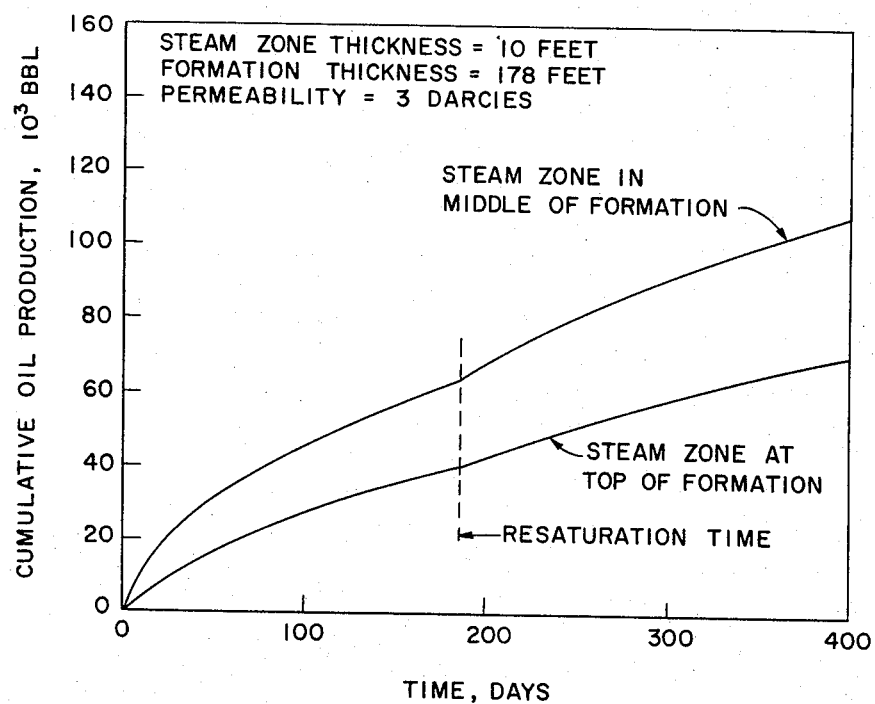

The invention will be better understood by reference to the drawings and the specific description thereof wherein:

FIGURE 1 is a vertical cross-section of a portion of an earth strata which includes a permeable oil-bearing reservoir penetrated by a borehole and shows conditions in the reservoir during the injection phase of the invention; and FIGURE 2 is the same cross-sectional view of the lower portion of the borehole shown in FIGURE 1 at a subsequent stage in the process during which backflow of effluents from the formation into the borehole is occurring; and FIGURE 3 is a graphical display of the process of this invention compared to the result obtained with a non-specific injection process.

The conditions illustrated in the drawings are generally the idealized situation which, of course, probably would not be those actually occurring in the reservoir but are illustrative of the general patterns occurring in the reservoir. Referring to FIGURES 1 and 2, showing the same cross-section of the reservoir in which the present invention is being applied, the same numeral designates identical parts within both figures. FIGURE 1, showing conditions in the reservoir during the injection phase of the process, illustrates a permeable oil-bearing reservoir 11 sandwiched between an upper impermeable layer 12 and a lower impermeable layer 13. The borehole penetrating reservoir 11 is shown with a casing 14 sealed in the borehole with a sealant 15, such as cement. This arrangement prevents fluid communication between reservoir 11 and the inside of casing 14.

Subsequent to the sealing of casing 14 in the borehole with sealant 15, perforations 16 are made through the casing and sealant in the middle or central portion of reservoir 11 to provide fluid communication between the reservoir and the inside of the casing. These perforations can be made with various conventional devices which are readily available, such as a shot device, and provide fluid communication between the inside of casing string 14 and reservoir 11 only in the central portion of the reservoir. It is to be specifically noted that this is the only place of fluid communication between the reservoir and the inside of the casing string. Also, numerous perforations can be used to provide the fluid communication even though only several are shown. Actually, the casing 14 could be severed from the lower portion thereof by a jet cutting tool in order to provide the necessary fluid communication if this is desired.

After the borehole has been cased and perforated as described above, the preferred practice is to lower a tubing string 22 through the inside of casing 14 equipped with a pair of straddle packers 24 spaced from one another on the downhole end of the string. Tubing string 22 is closed at its lower end and has an opening 23 located in the interval between the spaced packers 24. These spaced packers are of the conventional type and have actuatable sealing means 25 circling their periphery. Once tubing string 22 is lowered in casing 14 so that the packers 24 are on either side of perforations 16, the sealing means 25 are set, sealing off a chamber between the spaced packers. This restricts the fluid communication between the inside of tubing string 22 and reservoir 11 to a narrow portion of casing 14 having the perforations 16.

The purpose of using straddle packers and a tubing string 22 is to prevent heat loss of the fluid to the formation strata located above reservoir 11 since the annulus between the inside of casing 14 and the outside of tubing string 22 provides an insulating barrier. Straddle packers also make multiple completions possible but probably would not be used in shallow, single completion wells where the heat loss to the upper strata is not serious. Tubing string 22 can be insulated to lessen the heat loss to the formation strata above reservoir 11 but this is frequently not necessary. An alternative procedure in shallow wells is to inject steam down the annulus of the well and produce oil later through the tubing string 22. Also the tubing string 22 can contain a downhole pump for pumping the effluents backflowing into the well during the recovery step.

Subsequent to the preparation of the borehole as described above, steam is injected into the formation via tubing string 22 as indicated by arrows. In general, the injection of the steam tends to flow regularly out into the reservoir as indicated in FIGURE 1, expanding to a thickness of 20 or 30 feet. Due to the vertical permeability of the reservoirs in which this invention is practiced, the steam zone 18 tends to migrate vertically upward as the steam moves further out into the reservoir from ports 16 because of the tendency of this steam to rise. The thickness of zone 18 is controlled to some extent by the vertical spacing of the perforations 16 through casing 14 and sealant 15. With the perforations in a single plane thinner steam zones tend to be formed.

Since the steam is injected only into the isolated zone 18 within the central portion of reservoir 11, it tends to convert this zone into a large heat sink from which portions above and below zone 18 are heated. Further, since the steam moves only through zone 18, oil is not displaced from around the borehole except for part of the oil in zone 18, leaving substantial amounts of oil in the reservoir contiguous to the borehole. Because of the vertical permeability of the reservoir, the steam moving radially out into the reservoir tends to rise within the reservoir which will cause zone 18 to curve gently upward as it proceeds radially away from the borehole. Eventually, the steam zone will reach the top of the reservoir at locations remote from the borehole.

After the injection of the steam or the heated fluid has been completed into the isolated zone 18 of reservoir 11, the well is usually shut-in under pressure to retain the heated fluid within the formation for a "soak" period. As is well known to those skilled in the art, the duration of both the injection and of the "soak" periods can be widely varied depending upon the reservoir conditions, such as temperature of the heated fluid and thickness of the reservoir, to name a few. The purpose of the soak period is to allow the thermal energy in the heated fluid to be transferred to zone 18 and thence to other portions of the reservoir system both above and below zone 18. In some cases the soak period may be of negligible duration. Of course, as the reservoir system is heated, the crude oil therein is warmed and becomes less viscous which usually enhances the rate and amount of oil that will be subsequently produced from the reservoir by backflow for the injection of a given volume of heated fluids.

Once the soak period has been completed and at least a portion of the termal energy contained in the heated fluid has been transferred to the non-injected portions of reservoir 11 as indicated by the temperature gradient lines 19 of FIGURE 2, the oil in these areas is less viscous than it was in its natural state. Generally, at this point, oil can be produced form the reservoir merely by releasing the pressures used to retain the heated fluids in the reservoir during the soak period, or if desired, reducing these pressures to at least as low as, or below, the original pore pressure of the reservoir by pumping systems (not shown) used within casing 14. As the pressures in the formation are reduced via the borehole, a decreasing pressure gradient in the direction of the borehole develops and oil from zone 18 and also the portions of the reservoir 11 above and below zone 18 tends to flow toward the borehole as indicated by arrows 26 and into casing 14 through perforations 16. During this portion of the novel backflow process, it may be desirable to replace steam injection tubing string 22 with a production tubing string 21 and associated pumping equipment (not shown) to recover the oil draining into the casing 14. Tubing string 21 may or may not be required depending upon the pressures within the reservoir 11 and other factors which are within the knowledge of those skilled in the art; however, its use allows the bottom of the borehole to be used as a sump for collecting the oil.

To increase the rate of effluents entering the casing string, the injection, soak, backflow and recovery steps described above may be repeated.

It is important when carrying out the invention that the steam or heated fluid be injected through a limited zone in a central portion of the reservoir. By limited zone, it is intended that the perforations for injecting the steam or heated fluid be generally located centrally in the reservoir, i.e., in the middle one-third of reservoir 11 and preferably below the middle of the reservoir. Of course, the perforations can be spread out over this central interval. Normally, the interval in the middle third of the reservoir injected will be approximately 30 or 40 feet and a suitable number of perforations through the casing 14 at multiple levels will be required to provide the necessary fluid communication. However, in thin reservoir formations, it may be desirable only to perforate at a single level such as slightly below the middle of the reservoir.

Often, in the above discussion, steam has been referred to and discussed in the operation of the invention. However, it should be appreciated that other heated fluids can be used in place of steam, especially if these other heated fluids have a good heat carrying capacity. Examples of such fluids which could be used in place of steam are hot water, methane, ethane, propane, nitrogen and other inert, non-oxidizing gases or liquids. However, for the most part, the invention contemplates the use of steam or, in the alternative, hot water. Of course, the basic selection of the heated fluid to be used in the process revolves about the economics of such injection and for the most part, steam has the most amount of heat available per unit mass of injected fluid.

In practicing this invention, a heated fluid is injected at a pressure which exceeds the reservoir pore pressure in order that the heated fluid will move in through the reservoir from the casing. Higher than over-burden pressures can result in dangerous blowouts and should be avoided, especially in shallow reservoirs having less than 500 feet of overburden. In any case, the process is to be carried out below the overburden or fracture-propping pressure of the reservoir.

In general, because of the cross-flow which occurs in the instant invention, thick reservoirs are preferred, i.e., those having a thickness of 120 feet or greater and in reservoirs having a vertical injectivity of at least one-half that of the horizontal injectivity; those having thicknesses from 120 to 600 feet are the most preferred for the practice of this invention. Of course, in the thicker reservoirs, the heated fluid may be injected at several spaced locations within the middle third of the reservoir.

Since there is a tendency for the heated fluids injected into the reservoir of the type described to rise as they proceed radially out into the reservoir, the most desirable injection point within the middle third of the reservoir interval is a lower one-half of the middle third which will allow the heated fluids to proceed further radially out into the reservoir before the zone reaches the upper boundary of the reservoir, thereby treating a greater portion thereof. Usually the actual interval injected will be about 40 feet minimum in reservoirs having a thickness from 120 feet to 600 feet and often the injected interval or zone will be ¼ or less of the reservoir thickness. When the injection is restricted to this preferred level, the maximum penetration of the steam zone into the reservoir is achieved with the greatest transfer efficiency of the heat contained in the heated fluids and the amount of oil recovered from the reservoir is optimized per unit volume of heated fluid injected.

In order that the invention will be more easily understood from a practical point of view, the following examples are included for purposes of illustration but are not intended to be a limitation on the invention.

*Example I*

With flow meter surveys it was determined that steam, when a large interval is non-specifically injected, will usually enter only the top portion of the open reservoir interval. Thus, it was possible to make a comparison of the results obtained with the method of this invention with those that occur in non-specific injections into an open reservoir interval.

The data were obtained from the upper conglomerate zone in a gravity drainage reservoir wherein the vertical injectivity was equal to a little more than one-half the horizontal injectivity. Infill wells were chosen for both the "limited" specific injection method of this invention and for wells in which non-specific injections were carried out to give a standard. Since, in this field, the natural pressures were depleted and production was being accomplished by gravity drainage, the oil saturation and other conditions in each of the wells were similar.

The average producing interval of each of the wells was 398 feet and four were used as standards. One well in the middle was used as the test well for the method of this invention.

In the four wells used as standards, the entire 398 feet was open and injected with from 24,800 to 42,250 barrels of water as steam. In the test well the injection was limited to an interval of 88 feet just below the middle of the interval and 22,200 barrels of water as steam was injected.

On backflow, the test well produced 350 barrels of oil/day for the first month compared with 280 in the best producing standard well and thereafter the test well maintained over 100 barrels of oil/day better production than the average of the four standard wells during a seven month interval.

Thus, it can be seen that the technique of this invention is superior to non-specific injection.

*Example II*

This example is based on a 400 day comparison of the method of this invention with a sister well wherein the injection was non-specific. The data are shown graphically in FIGURE 3 and it can be seen that about 54% more oil was produced using the method of this invention.

I claim as my invention:

1. An improved method for recovering oil from gas-permeable, subterranean reservoirs by backflowing wherein the reservoir interval has a vertical injectivity equal to at least one-half of the horizontal injectivity comprising:
   (a) penetrating such a gas-permeable reservoir interval with a borehole;
   (b) inserting a casing string into said reservoir interval of said borehole and sealing it therein to prevent the fluid communication between the inside of said casing string and said reservoir interval;
   (c) providing fluid communication between said inside of said casing string and said reservoir interval only in the central portion of said reservoir interval;
   (d) injecting heated fluids having a temperature above the natural temperature of said reservoir interval through said fluid communication established in said central portion of said reservoir interval via said casing string;
   (e) retaining said heated fluids in said reservoir interval for a period sufficient for some of the heat of said heated fluids to be transferred to said reservoir interval;
   (f) backflowing said reservoir interval through said fluid communication in said central portion of said reservoir interval to recover effluents from said reservoir interval; and
   (g) recovering effluents entering said casing string during said backflowing step.

2. A method according to claim 1 wherein the borehole traverses the whole reservoir interval.

3. The method according to claim 1 wherein the fluid communication between the inside of the casing string and the reservoir interval is established in the middle third of said reservoir interval.

4. A method according to claim 1 wherein the heated fluids injected into the reservoir interval are primarily steam.

5. A method according to claim 1 wherein the heated fluids are retained in the reservoir interval for a period sufficient to transfer some of the heat of said heated fluids in the reservoir interval by maintaining a sufficient pressure thereon and the backflowing of said reservoir interval is accomplished by reducing the retained pressures to a value at least as low as the original pore pressure of the reservoir interval.

6. A method according to claim 5 wherein the pressures within the borehole are reduced below that of the original pore pressure of the reservoir interval during the backflowing step.

7. A method according to claim 1 wherein steps (d) through (g) are repeated to increase the rate of effluents entering the casing string.

References Cited

UNITED STATES PATENTS

| | | | |
|---|---|---|---|
| 3,126,961 | 3/1964 | Craig et al. | 166—40 |
| 3,154,142 | 10/1964 | Latta | 166—2 |
| 3,221,813 | 12/1965 | Closmann et al. | 166—40 X |
| 3,280,909 | 10/1966 | Closmann et al. | 166—11 |

OTHER REFERENCES

Keplinger, C. H.: Economic Considerations Affecting Steam Flood Prospects, In Producers Monthly, 29(5), May 1965, pp. 14–16 and 18–21. TN 860 p. 7.

CHARLES E. O'CONNELL, *Primary Examiner.*

IAN A. CALVERT, *Assistant Examiner.*